(12) United States Patent
van de Poll

(10) Patent No.: US 8,851,333 B2
(45) Date of Patent: Oct. 7, 2014

(54) DOSING CAP FOR CONTAINER

(75) Inventor: Jonkheer Theodoor Hendrik van de Poll, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/883,015

(22) PCT Filed: Oct. 26, 2011

(86) PCT No.: PCT/EP2011/068761
§ 371 (c)(1),
(2), (4) Date: May 2, 2013

(87) PCT Pub. No.: WO2012/062576
PCT Pub. Date: May 18, 2012

(65) Prior Publication Data
US 2013/0214008 A1    Aug. 22, 2013

(30) Foreign Application Priority Data

Nov. 9, 2010    (EP) .................................... 10190439

(51) Int. Cl.
| | | |
|---|---|---|
| B65D 37/00 | (2006.01) | |
| B05B 11/00 | (2006.01) | |
| G01F 11/26 | (2006.01) | |
| B05B 11/04 | (2006.01) | |
| G01F 11/28 | (2006.01) | |
| B05B 11/02 | (2006.01) | |

(52) U.S. Cl.
CPC .......... *G01F 11/263* (2013.01); *B05B 11/3069* (2013.01); *B05B 11/3008* (2013.01); *B05B 11/0018* (2013.01); *B05B 11/02* (2013.01); *B05B 11/04* (2013.01); *G01F 11/288* (2013.01); *B05B 11/3067* (2013.01); *B05B 11/3001* (2013.01); *B05B 11/0072* (2013.01); *B05B 11/047* (2013.01); *B05B 11/0045* (2013.01); *B05B 11/0059* (2013.01); *B05B 11/3076* (2013.01)
USPC ........... 222/207; 222/212; 222/282; 222/309; 222/434; 222/438; 222/519; 222/454

(58) Field of Classification Search
CPC .. B05B 11/0072; B05B 11/04; B05B 11/047; B05B 11/3008; B05B 11/3067; B05B 11/3069; B05B 11/0018; B05B 11/0045; B05B 11/0059; B05B 11/02; G01F 11/263; G01F 11/288
USPC ......... 222/207, 212, 213, 282, 285, 286, 305, 222/309, 513, 514, 523, 434, 438, 439, 519, 222/520, 477, 454, 455, 456
See application file for complete search history.

(56) References Cited

U.S. PATENT DOCUMENTS 1,069,017 A * 7/1913 Lassen et al. .................. 222/439
1,283,050 A * 10/1918 Berg .............................. 222/322
(Continued)

OTHER PUBLICATIONS

European Search Report for Application No. EP10190439 completed Jun. 15, 2011.    (Continued)

*Primary Examiner* — Kevin P Shaver
*Assistant Examiner* — Patrick M Buechner
(74) *Attorney, Agent, or Firm* — Michael P. Aronson

(57) ABSTRACT

A dispenser cap (10) for a liquid container having an opening, the cap (10) comprising a means for attachment (30) to the container, a housing (12) inserted into the opening and comprising a liquid inlet (14), a channel and a liquid outlet (16), the channel comprising a moveable seal (18) defining an outlet-side liquid volume (24) and an inlet-side liquid volume (26), the moveable seal (18) is moveable from a first position to a second position towards the liquid outlet (16) by increasing the inlet-side liquid pressure, thereby causing a dispensable volume of liquid flow out of the outlet (16), the moveable seal (18) also comprising a liquid outlet seal means (22) to seal the liquid outlet when the moveable seal (18) is in its second position, thereby preventing further flow of liquid out of the outlet (16), the cap (10) also comprising a dispensable liquid volume adjustment means (32,34) to adjust the fixed volume of dispensable liquid.

20 Claims, 2 Drawing Sheets

(56) References Cited

U.S. PATENT DOCUMENTS

Figure 1:
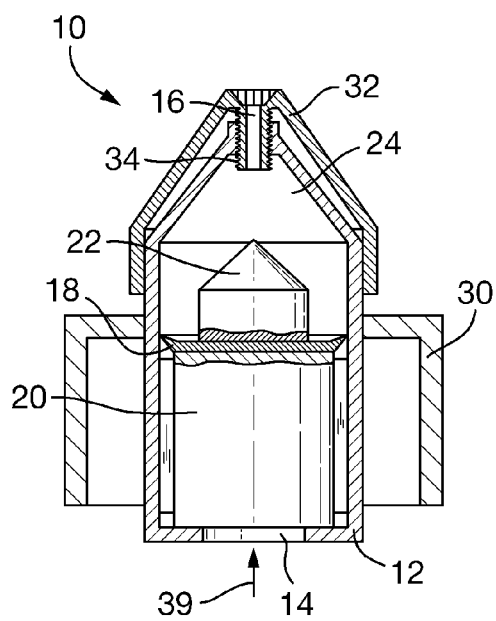

| | | | |
|---|---|---|---|
| 2,904,227 A * | 9/1959 | Graham | 222/207 |
| 3,091,374 A * | 5/1963 | Schwartzman | 222/448 |
| 3,134,514 A * | 5/1964 | Booth | 222/207 |
| 4,143,794 A * | 3/1979 | Stratford et al. | 222/42 |
| 4,151,934 A * | 5/1979 | Saeki | 222/437 |
| 4,811,871 A * | 3/1989 | Wass et al. | 222/477 |
| 4,946,080 A * | 8/1990 | Vesborg | 222/500 |
| 5,174,478 A * | 12/1992 | Reyman | 222/207 |
| 5,184,760 A * | 2/1993 | Weinstein et al. | 222/207 |
| 5,253,788 A | 10/1993 | Vandromme et al. | |
| 5,947,335 A * | 9/1999 | Milio et al. | 222/136 |
| 6,241,129 B1 | 6/2001 | Bonningue et al. | |
| 6,334,550 B1 * | 1/2002 | De Backer | 222/205 |
| 6,341,718 B1 | 1/2002 | Schilthuizen et al. | |
| 6,343,716 B1 * | 2/2002 | Baudin et al. | 222/207 |
| 6,415,961 B2 * | 7/2002 | Bonningue | 222/249 |
| 6,484,906 B2 * | 11/2002 | Bonningue | 222/207 |
| 2002/0014499 A1 * | 2/2002 | Bonningue | 222/185.1 |
| 2002/0017536 A1 * | 2/2002 | Bonningue | 222/207 |
| 2011/0089191 A1 * | 4/2011 | Altonen et al. | 222/1 |
| 2014/0008398 A1 * | 1/2014 | Law et al. | 222/477 |

OTHER PUBLICATIONS

International Search Report for International Application No. PCT/EP2011/068761 completed Feb. 2, 2012.

* cited by examiner

DOSING CAP FOR CONTAINER

TECHNICAL FIELD

The present invention relates to a dispenser cap for a liquid container, or a container comprising the cap integrally formed therewith, which can deliver a fixed dose of liquid reliably and simply.

BACKGROUND TO THE INVENTION

Certain liquid compositions are intended to be dispensed and applied in specified quantities. For example cleaning products in liquid form typically instruct the end user to dose particular volumes for a desired cleaning performance to be provided.

One simple solution to this problem is to provide a measuring container with the liquid product. However, this solution, although simple, suffers from the danger of the measuring container becoming lost or separated from the liquid container.

To address this problem, dispensing caps for liquid containers have been developed which are designed to deliver fixed quantities of liquid. As the dispensing cap is integral to the container, it cannot become detached and lost.

However, although delivery of a fixed volume of liquid may be desirable, it would be a further advantage if the volume of liquid was adjustable by the user. However, combining this flexibility with the reproducibility of a fixed volume presents a particular challenge.

U.S. Pat. No. 6,341,718 discloses a squeeze bottle for dispensing a liquid in a metered manner, driven by the end user squeezing the container. However, the volume dispensed cannot be varied by the end user and remains fixed. U.S. Pat. No. 6,241,129 discloses a dosing head for dispensing a fluid product in the form of doses of predetermined volume. U.S. Pat. No. 5,253,788 discloses a device for dispensing and dosing a product, such as a cream, gel, or milk.

SUMMARY OF THE INVENTION

In a first aspect, the invention relates to a dispenser cap for a liquid container having an opening, the cap comprising a means for attachment to the container at the opening, a housing for insertion into the opening, the housing comprising a liquid inlet to receive liquid from the container, a channel and a liquid outlet to expel liquid from the container, the channel comprising a moveable seal defining an outlet-side liquid volume and an inlet-side liquid volume, the moveable seal being biased to a first position towards the liquid inlet, and is moveable from the first position to a second position towards the liquid outlet by increasing the inlet-side liquid pressure, such movement thereby causing a dispensable volume of liquid to flow out of the outlet, the moveable seal also comprising a liquid outlet seal means which is operable to seal the liquid outlet when the moveable seal is in its second position, thereby preventing further flow of liquid out of the outlet, the cap also comprising a dispensable liquid volume adjustment means operable to permit an end user to adjust the fixed volume of dispensable liquid, by manipulation of the volume adjustment means, and wherein the liquid outlet is a non-return valve, allowing only the flow of liquid out and no backflow of atmospheric gas into the container.

In a second aspect, the invention relates to a container for holding a liquid, comprising a dispenser cap, the dispenser cap comprising a channel having a liquid inlet and ending with a liquid outlet to expel liquid from the container, the channel comprising a moveable seal defining an outlet-side liquid volume and an inlet-side liquid volume, the container comprising means for increasing the pressure of the inlet-side liquid, the moveable seal being biased to a first position towards the liquid inlet and is moveable from the first position to a second position toward the liquid outlet by increasing the inlet-side liquid pressure, such movement thereby causing a dispensable volume of liquid to flow out of the outlet, the moveable seal also comprising a liquid outlet seal means which is operable to seal the liquid outlet when the moveable seal is in its second position, thereby preventing further flow of liquid out of the outlet, the cap also comprising a dispensable liquid volume adjustment means, operable to permit an end user to adjust the fixed volume of dispensable liquid, the amount of which is selectable by manipulation of the volume adjustment means, and wherein the liquid outlet is a non-return valve, allowing only the flow of liquid out and no backflow of atmospheric gas into the container.

DETAILED DESCRIPTION

With such an arrangement, the invention allows the delivery of a fixed amount of liquid from a container, such as a squeezable container, irrespective of how much pressure is applied to the inlet-side liquid volume. Furthermore, fixed amount of liquid can be adjusted by the user so that greater or lesser amounts of liquid can be dispensed, as desired.

When the dispenser cap is in an unpressurised arrangement and the seal is in its first position (held there by biasing means), an outlet-side liquid volume is present and ready to be dispensed. The user increases the inlet-side liquid pressure, e.g. by squeezing the container. The seal then responds to the increase in pressure and moves towards the outlet, dispensing liquid until it reaches its second position.

In a preferred embodiment, the seal permits flow of liquid from the inlet-side to the outlet-side provided there is a sufficient pressure difference across it. This is highly counter-intuitive because, on first consideration, it would seem to be contrary to the aim of controlling or fixing the quantity of liquid dispensed. The inventors have found that, surprisingly this does not prevent fixed quantities of liquid from being dispensed and in fact provides for a mechanically simple arrangement which is robust.

However, although liquid has the potential to flow from the inlet-side liquid volume past the seal (because there is a pressure difference) until the outlet-side liquid is at the same pressure as the inlet-side liquid, this is found not to occur in practice. The seal is capable of physically moving from its first position towards its second position, driven by the difference in pressure on either side of the seal. It is to be noted that only a very small movement of the seal would be sufficient for the reduction in volume available for the outlet-side liquid volume to translate into an increase in pressure, as liquids are highly incompressible.

The inventors have discovered that any difference in pressure between the inlet-side liquid volume and outlet-side liquid volume is very quickly eliminated by a small movement of the seal. Thus, practically no liquid passes the seal, despite large pressure differences being introduced across it.

This balancing of pressure is maintained during dispensing so that both the inlet-side and outlet-side have elevated pressure due to squeezing, but the pressures are essentially the same, so no liquid can flow past the seal and into the outlet-side liquid volume.

Eventually the seal arrives at its second position. Once in the second position the liquid outlet seal means closes off the liquid outlet, e.g. by covering it. Further increases in the pressure of the inlet side liquid volume can no longer cause the seal to move and so no rebalancing of pressure between outside liquid volume and inlet-side liquid volume can occur. Thus, further squeezing establishes a pressure difference across the seal which has the effect of pressing the liquid outlet seal means with a force directly in proportion to the pressure difference.

Thus, even if a small amount of liquid flows past the seal, it cannot be dispensed because the outlet is sealed. Furthermore, the strength of the seal is proportional to the pressure applied, so responds exactly enough to prevent further dispensing.

Thus, a fixed dose of liquid is dispensed regardless of the magnitude and duration of squeezing applied.

Once the pressure on the inlet-side is removed following dispensing the seal can begin to move from the second position towards the first position by action of the biasing means. This will have the initial effect of reducing the pressure on the outlet-side liquid volume (for not all of the outlet-side liquid volume is dispensed). This results in liquid flowing from the inlet-side liquid volume past the seal into the outlet-side liquid volume in response to the pressure difference. This flow acts to rebalance the pressure differences, allowing the biasing means to overcome the reduced pressure difference and continue to move the seal to its first position.

Thus, once back at the first position the outlet-side liquid volume is full of liquid and the whole process can begin again if a second dose is required.

As discussed, the means for increasing the inlet-side pressure is preferably in the form of the container being squeezable. This is the simplest and most convenient form. However alternatives are possible, and the container can be collapsible, for example. Alternatively the container may comprise a syringe wherein injection of a body into the container reduces the volume available and thus raises the pressure accordingly.

In the first aspect, the dispenser cap may be attachable to the container in a variety of ways known in the art. Typically this is simply by means of a screw thread, although other arrangements such as snap-on or similar can be employed as desired.

The liquid outlet typically requires a difference in pressure across it to allow liquid to flow out. The liquid outlet is a non-return valve, allowing only the flow of liquid out and no backflow of atmospheric gas into the container. It is thus desirable to have some means for introducing atmospheric gas into the container to replace the liquid which has been dosed. Thus, in a preferred embodiment, the dosing cap comprises a channel providing gaseous communication between the inlet-side liquid volume and the atmosphere outside the container. Preferably this channel is provided with a non-return valve, allowing only the inlet of air from the atmosphere outside the bottle into the inlet-side liquid volume.

Typically the housing will be cylindrical and the seal means being a circular arrangement within the cylindrical housing. However, other shapes are possible.

The seal means separates the inlet-side liquid volume from the outlet-side liquid volume. At the same time it is preferably capable of allowing liquid to flow from the inlet-side to the outlet-side provided a sufficient pressure difference across the seal exists. Thus, the seal is effectively designed to "fail" as a seal when a pressure difference exists.

In a preferred embodiment the seal comprises a resilient material which forms its seal by pressing onto the inside walls of the housing. Once a sufficient pressure difference is established, the resilient material can deform to move away from the wall of the housing and to allow liquid to pass. Once the pressure difference is removed, the seal is re-established to prevent any further flow. For example, a circular flap of siliconised material or other resilient material with a diameter a little greater than that of the inside walls of the housing, provides a suitable seal.

The liquid outlet seal means is another essential element of the invention. This acts to prevent flow out of the liquid outlet when the seal is in its second position. In a preferred embodiment, this is established by surrounding the outlet or otherwise covering it. In a further preferred embodiment, this is established by the liquid outlet seal means comprising a region which forms a seal around the outlet with a defined thickness.

In this way, further increases in pressure applied merely act to press the outlet seal more strongly, thus making the seal stronger. Thus, no liquid can leave the outlet by squeezing done when the seal is in its second position.

Thus the liquid outlet seal means may comprise a resilient material adapted to engage a portion of the housing surrounding the liquid outlet. Preferably the engagement involves the liquid outlet seal means to engage a face parallel to a face of the housing to provide the seal.

Another essential element of the invention is the dispensable liquid volume adjustment means. This allows a user to adjust the volume of liquid that is dispensed, so that the fixed volume dispensed can be increased or decreased as desired by the user.

Typically the volume adjustment means operates by the first and/or second position of the seal being moveable with respect to the housing. Thus, as the amount of liquid dispensed is governed by the movement from the first to the second position, the amount of the fixed volume dispensed can be adjusted by altering the relative spacing of the starting and finishing positions of the seal.

For example, one preferred method of adjusting the second position is to include a moveable portion surrounding the liquid outlet. For example, the liquid outlet could be surrounded by a tube, one end of which is the portion of the housing which is engaged by the seal as it arrives at its second position. Permitting such a tube to be moveable would result in the fixed volume being adjustable.

In one embodiment, such a tube could be attached to a mounting, threaded onto the housing. By rotating the mounting, the tube would alter its position with respect to the channel, thus providing the adjustable fixed volume.

A similar arrangement could be conceived for adjusting the first position by providing a movable butt or by manipulation of the biasing means for example.

Many other methods of altering the first and/or second position may be conceived.

The invention will now be illustrated, by way of example only, and with reference to the following figures, in which:

FIGS. 1 to 5 are sectional side views of a dispensing cap according to the present invention.

Turning to the figures, FIGS. 1 to 5 illustrate a dispensing cap 10 according to the invention. The cap 10 comprises a cylindrical housing 12 comprising a liquid inlet 14 and a liquid outlet 16.

Contained within the housing 12 is a movable seal 18 attached to a plunger 20. The seal 18 also comprises a liquid outlet seal means 22. The seal 18 defines an outlet-side liquid volume 24 and an inlet-side liquid volume 26. The inlet-side liquid volume 26 extends into the bottle, because of the opening of liquid inlet 14. The plunger 20 has a smaller outer diameter than the internal diameter of the housing 12, creating a channel for flow of liquid between the plunger 20 and housing 12. This facilitates the liquid flow past the plunger 20 from the inlet-side liquid volume 26 to the outlet-side liquid volume 24. The plunger 20 may be kept at its position by spokes extending from the outside wall of the plunger 20 to the inside wall of the housing 12.

The dispensing cap 10 can be attached to any suitable liquid container by threaded portion 30. The portion 30 may contain a channel providing gaseous communication between the inlet-side liquid volume 26 and the atmosphere outside the container. Preferably this channel is provided with a non-return valve, allowing only the inlet of air from the atmosphere outside the container into the inlet-side liquid volume.

Threaded onto the outside of the housing 12 is a mounting 32 which comprises a tube 34 which protrudes snugly into liquid outlet 16.

FIG. 1 shows the seal 18 in its first position. When the container (not shown) to which it is attached is squeezed this results in an increase in the inlet-side liquid volume in the container. This establishes a force 39 on plunger 20. The force 39 moves the plunger 20 and its seal 18 sufficiently to increase the outlet side 24 pressure. This rebalancing of pressure prevents any flow of liquid passed seal 18. The increased pressure on the outlet liquid volume 24 causes dispensing of liquid out of the outlet 16.

Figure 2:
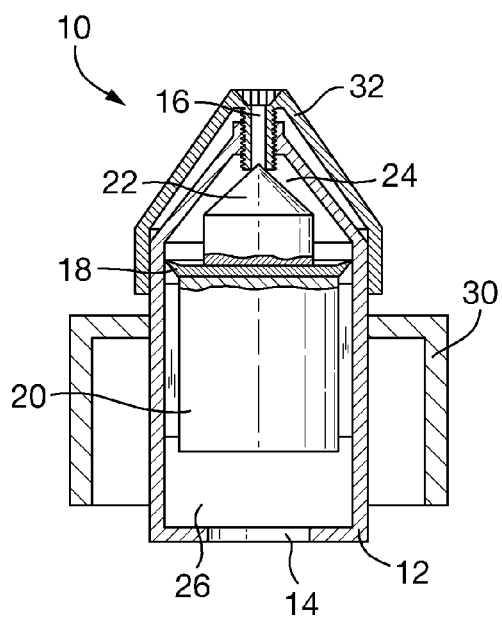

The end user continues to squeeze the container and the plunger 20, and seal 18 gradually moves towards the second position as shown in FIG. 2. As the plunger moves, it maintains approximate equality of pressure between the inlet-side liquid volume 26 and the outlet-side liquid volume 24.

As can be seen from FIG. 2, a portion of the outlet seal means 22 is connected with the end of tube 34. This has the effect of sealing off the liquid outlet 16, thus preventing any further flow of liquid. It can also be seen that a portion of the outlet-side liquid volume 24 remains undispensed.

Further application of force 39 cannot cause further movement of plunger 20 and seal 18 in view of the contact made between the liquid outlet seal 22 and the tube 34. The pressure difference established may result in a small flow of liquid into volume 24. However, the pressure applied also forces the seal 22 with the tube 34 to be tight, preventing any flow of liquid out of the outlet 16.

Once dispensing ends, the end user releases pressure on the inlet side liquid volume. The biasing means (not shown) then returns plunger 20 and seal 18 back to the first position as shown in FIG. 1. The biasing means may be an elastic band which is attached to the housing 12, and the plunger 20. This elastic band is stretched upon moving plunger 20 from its first to its second position, and is relaxed again when the plunger 20 and seal 18 return from its second to its first position. This leads to an underpressure in outlet-side liquid volume 24, and as the liquid outlet 16 is a non-return valve, allowing only the flow of liquid out and no backflow of atmospheric gas into the container, another dose of liquid will flow from the inlet-side liquid volume 26 past the plunger 20 and seal 18 into the outlet-side liquid volume 24 in response to the pressure difference.

Once completed the container can be put into a non-inverted state and the liquid will remain in the outlet-side liquid volume as it cannot pass seal 18, despite a difference in pressure. Thus, when another dose is required, the container can be inverted and dispensing of another fixed volume carried out.

Figure 3:
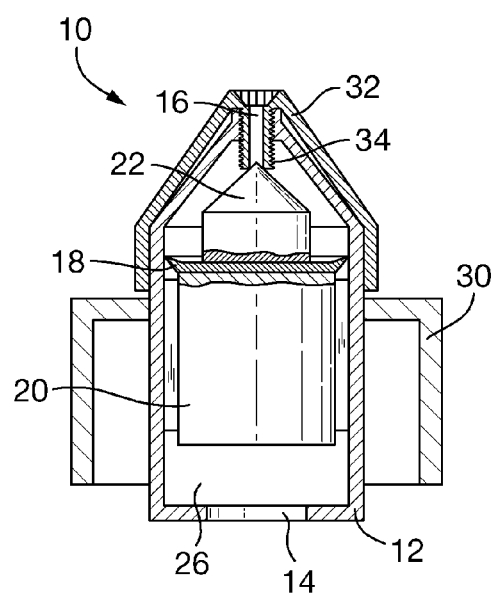
Figure 4:
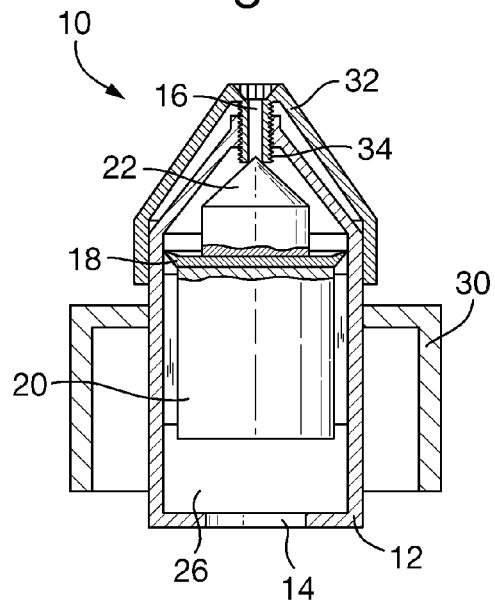
Figure 5:
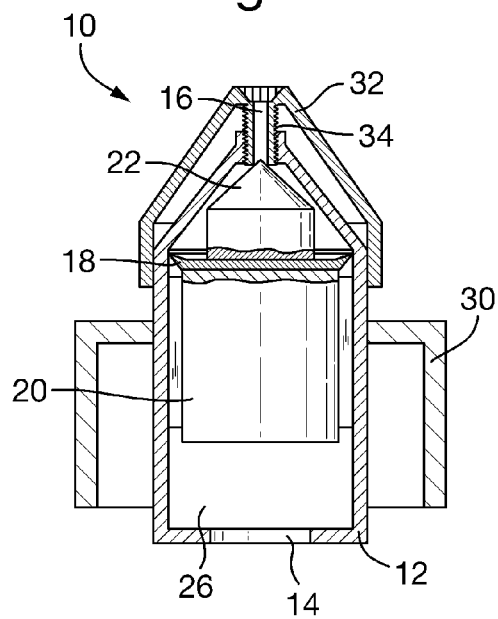

In all of FIGS. 3 to 5 the seal 18 is shown in its second position as shown by the liquid outlet seal means 22 abutting tube 34, thus sealing off the liquid outlet 16.

However, in each of FIGS. 3 to 5 the location of the second position differs relative to the housing 12 due to the tube 34 being at a different location in each figure.

FIG. 4 shows the tube 34 in an intermediate position. If the mounting 32 is rotated by the user, the threading will cause the tube 34 either to move inwardly with respect to the housing 12 (i.e. towards the configuration shown in FIG. 3) or outwardly with respect to the housing 12 (i.e. towards the configuration shown in FIG. 5).

As can be seen in FIGS. 3 to 5, the amount of undispensed liquid varies according to the position of the tube 34. Thus the amount of dispensed liquid must also vary in like manner. In other words, as the first position remains unaltered, the user can adjust the amount of the fixed volume dispensable by rotation of the mounting 34 prior to squeezing.

The invention claimed is:

1. A dispenser cap (10) for a liquid container having an opening,
    the cap (10) comprising a means for attachment (30) to the container at the opening,
    a housing (12) for insertion into the opening,
    the housing (12) comprising a liquid inlet (14) to receive liquid from the container,
    a channel and a liquid outlet (16) to expel liquid from the container,
    the channel comprising a moveable seal (18) defining an outlet-side liquid volume (24) and an inlet-side liquid volume (26),
    the moveable seal (18) being biased to a first position towards the liquid inlet (14),
    and is moveable from the first position to a second position towards the liquid outlet (16) by increasing the inlet-side liquid pressure,
    such movement thereby causing a dispensable volume of liquid flow out of the outlet (16), characterised in that
    the moveable seal (18) also comprising a liquid outlet seal means (22) which is operable to seal the liquid outlet (16) when the moveable seal (18) is in its second position,
    thereby preventing further flow of liquid out of the outlet (16),
    the cap (10) also comprising a dispensable liquid volume adjustment means (32, 34),
    operable to permit an end user to adjust the fixed volume of dispensable liquid,
    by manipulation of the volume adjustment means (32, 34),
    and wherein the liquid outlet (16) is a non-return valve, allowing only the flow of liquid out and no backflow of atmospheric gas into the container.

2. A dispenser cap (10) according to claim 1, wherein the liquid outlet (16) requires a difference in pressure across it to allow liquid to flow out of the outlet (16).

3. A dispenser cap (10) according to claim 1, wherein the moveable seal (18) is arranged to allow the flow of liquid from the inlet-side liquid volume (26) to the outlet-side liquid volume (24) when it is in both its first and second positions and when there is a difference in pressure across the seal.

4. A dispenser cap (10) according to claim 1, wherein the housing (12) is cylindrical and the seal means (18) is a circular arrangement within the cylindrical housing (12).

5. A dispenser cap (10) according to claim 1, wherein the moveable seal (18) comprises a resilient material which forms its seal by pressing onto the inside walls of the housing (12).

6. A dispenser cap (10) according to claim 1, wherein the moveable seal (18) comprises a circular flap of resilient material with a diameter a little greater than that of the inside walls of the housing (12).

7. A dispenser cap (10) according to claim 1, wherein the dispenser cap (10) comprises a channel providing gaseous communication between the inlet-side liquid (26) and the atmosphere outside the container.

8. A dispenser cap (10) according to claim 7, wherein the channel comprises a non-return valve, allowing only the inlet of air from the atmosphere outside the container into the inlet-side liquid volume (26).

9. A dispenser cap (10) according to claim 1, wherein the liquid outlet seal means (22) operates by surrounding the outlet or otherwise covering it.

10. A dispenser cap (10) according to claim 9, wherein the engagement involves the liquid outlet seal means (22) to engage a face parallel to a face of the housing (12) to provide the seal.

11. A dispenser cap (10) according to claim 1, wherein the volume adjustment means (32, 34) operates by the first and/or second position of the seal (18) being moveable with respect to the housing (12).

12. A dispenser cap (10) according to claim 11 wherein the volume adjustment means (32, 34) operates by the second position being moveable with respect to the housing (12) by means of the housing (12) comprising a tube (34) surrounding the liquid outlet (16) whose position is moveable.

13. A container for holding a liquid, comprising a dispenser cap (10), the dispenser cap (10) comprising a channel having a liquid inlet (14) and ending with a liquid outlet (16) to expel liquid from the container, the channel comprising a moveable seal (18) defining an outlet-side liquid volume (24) and an inlet-side liquid volume (26), the container comprising means for increasing the pressure of the inlet-side liquid, the moveable seal (18) being biased to a first position towards the liquid inlet (14) and is moveable from the first position to a second position toward the liquid outlet (16) by increasing the inlet-side liquid pressure, such movement thereby causing a dispensable volume of liquid to flow out of the outlet (16), characterised in that the moveable seal (18) also comprising a liquid outlet seal means (22) which is operable to seal the liquid outlet (16) when the moveable seal is in its second position, thereby preventing further flow of liquid out of the outlet (16), the cap (10) also comprising a dispensable liquid volume adjustment means (32, 34), operable to permit an end user to adjust the fixed volume of dispensable liquid, by manipulation of the volume adjustment means (32, 34), and wherein the liquid outlet (16) is a non-return valve, allowing only the flow of liquid out and no backflow of atmospheric gas into the container.

14. A container according to claim 13, wherein the means for increasing the inlet-side pressure is in the form of the container being squeezable.

15. A container according to claim 13, wherein the dispenser cap (10) is attachable to the container by means of a screw thread.

16. A container according claim 13, wherein the liquid outlet (16) requires a difference ire pressure across it to allow liquid to flow out of the outlet (16).

17. A container according to claim 13, wherein the moveable seal (18) is arranged to allow the flow of liquid from the inlet-side liquid volume (26) to the outlet-side liquid volume (24) when it is in both its first and second positions and when there is a difference in pressure across the seal.

18. A container according to claim 13, wherein the housing (12) is cylindrical and the seal means (18) is a circular arrangement within the cylindrical housing (12).

19. A container according to claim 13, wherein the dispenser cap (10) comprises a channel providing gaseous communication between the inlet-side liquid (26) and the atmosphere outside the container.

20. A container according to claim 19, wherein the channel comprises a non-return valve, allowing only the inlet of air from the atmosphere outside the container into the inlet-side liquid volume (26).

* * * * *